US009509511B2

(12) United States Patent
Bhattachar et al.

(10) Patent No.: US 9,509,511 B2
(45) Date of Patent: Nov. 29, 2016

(54) IDENTITY BASED ENCRYPTION

(71) Applicant: TATA CONSULTANCY SERVICES LIMITED, Mumbai, Maharashtra (IN)

(72) Inventors: Rajan Mindigal Alasingara Bhattachar, Bangalore (IN); Barkur Suryanarayana Adiga, Bangalore (IN); Shivraj Vijayshankar Lokamathe, Bangalore (IN); Ravishankara Shastry, Bangalore (IN); Balamuralidhar Purushothaman, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 226 days.

(21) Appl. No.: 14/477,226

(22) Filed: Sep. 4, 2014

(65) Prior Publication Data
US 2015/0071435 A1 Mar. 12, 2015

(30) Foreign Application Priority Data
Sep. 6, 2013 (IN) .......................... 2907/MUM/2013

(51) Int. Cl.
*H04L 9/30* (2006.01)
*G09C 1/00* (2006.01)
(52) U.S. Cl.
CPC .............. *H04L 9/3073* (2013.01); *G09C 1/00* (2013.01); *H04L 9/30* (2013.01); *H04L 2209/805* (2013.01)
(58) Field of Classification Search
CPC ..... G09C 1/00; H04L 9/30; H04L 2209/805; H04L 9/3073
See application file for complete search history.

(56) References Cited

U.S. PATENT DOCUMENTS 8,320,559 B1 11/2012 Boneh et al.

OTHER PUBLICATIONS

Atzori et al., "The Internet of Things: A survey", Computer Networks, 54(15), 2010, pp. 2287-2805, Italy.
Heer et al., "Security Challenges in the IP based Internet of Things", Springer Journal, Wireless Personal Communications, 61(3), 2011 http://link.springer.com/article/10.1007%2Fs11277-011-0385-5.
Ren et al., "On Broadcast Authentication in Wireless Sensor Networks", IEEE Transactions on Wireless Communications, vol. 6, No. 11, Nov. 2007, pp. 4136-4144, USA.
Koo et al., "Implementation and Analysis of New Lightweight Cryptographic Algorithm Suitable for Wireless Sensor Networks", International Conference of Information Security and Assurance, Apr. 2008, Korea.

(Continued)

*Primary Examiner* — Tri Tran
(74) *Attorney, Agent, or Firm* — Hamre, Schumann, Mueller & Larson, P.C.

(57) ABSTRACT

Method and system for identity based encryption are described. The method comprises obtaining public parameters and a public key set from a central server, where the public parameters include a friendly prime, a torsion group prime order, an super-singular elliptic curve, a first torsion group, a pre-computed Tate pairing value, a first elliptic curve point and a second elliptic curve point, and a distortion map, and where the pre-computed Tate pairing value is generated by the central server. Further, a receiver key set of elliptic curve points based on a receiver identity of a receiver is determined, where the receiver key set is a subset of the public key set. Further a receiver public key based on the receiver key set is computed. Further, the data is encrypted using the Tate pairing value and an encryption component, wherein the encryption component is computed based on the receiver public key set.

15 Claims, 3 Drawing Sheets

(56) References Cited

OTHER PUBLICATIONS

Oliveira et al., "TinyTate: Identity-Based Encryption for Sensor Networks," Fifth Annual IEEE International Conference on Pervasive Computing and Communications Workshops, 2007, University of Campinas, Brazil.

Maas, "Pairing-Based Cryptography," Master's Thesis, Technische Universiteit Eindhoven, Jan. 2004.

Goyal et al., "Attribute Based Encryption for Fine-Grained Access Conrol of Encrypted Data", ACM Conference on Computer and Communications Security (ACM CCS), 2006.

Oliveira et al., TinyTate: Computing the Tate Pairing in Resource-Constrained Sensor Nodes, Sixth IEEE International Symposium on Network Computing and Applications (NCA), 2007, Brazil.

Boyen et al., "Identity-Based Cryptography Standard (IBCS) #1: Supersingular Curve Implementations of the BF and BB1 Cryptosystems", Network Working Group, RFC 5091 (Informational), Dec. 2007.

"IEEE P1636.3™/D1 Draft Standard for Identity-based Public-key Cryptography using Pairings", The Institute of Electrical and Electronic Engineers, Inc., Apr. 2008, New York, USA http://grouper.ieee.org/groups/1363/IBC/material/P1363.3-D1-200805.pdf.

"Machine-to-Machine Communications (M2M); mla, dla and mid interfaces", European Telecommunications Standards Institute, Feb. 2012 http://www.etsi.org/deliver/etsi_ts/102900_102999/102921/01.01.01_60/ts_102921v010101p.pdf.

Cakulev et al., "MIKEY-IBAKE: Identity-Based Authenticated Key Exchange (IBAKE) Mode of Key Distribution in Multimedia Internet KEYing (MIKEY)", Internet Engineering Task Force (IETF) RFC 6267 (Informational), Jun. 2011.

Mohan et al., "Fast Algorithms for Implementing RSA Public Key Cryptosystem", Electronics Letters, vol. 21, No. 17, Aug. 15, 1985, p. 761.

Agrawal et al., "Primes is in P", Department of Computer Science & Engineering, Indian Institute of Technology, Kanpur, India, 2004.

Bailey et al., "Optimal Extension Fields for Fast Arithmetic in Public-Key Algorithms", Advances in Cryptology CRYPTO98, LNCS, Springer-Verlag (Berlin, Germany), vol. 1462, 1998.

IDENTITY BASED ENCRYPTION

FIELD OF INVENTION

The present subject matter relates to cryptography and, in particular, to identity based encryption.

BACKGROUND

In today's world, with increasing exchange of information between various entities, cryptography is being commonly implemented for ensuring safety of the information being exchanged. Cryptography may be understood as a technique used for converting the information into an inapprehensible form which may not be easily retraced by a communicating party other than the intended recipient. Implementation of cryptography helps in securing the information against malicious attacks, for example, by hackers. Further, cryptography also preserves the security of the information in a case where the information is wrongly transmitted to an undesired recipient.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of systems and/or methods in accordance with embodiments of the present subject matter are now described, by way of example only, and with reference to the accompanying figures, in which.

DETAILED DESCRIPTION

Figure 1:
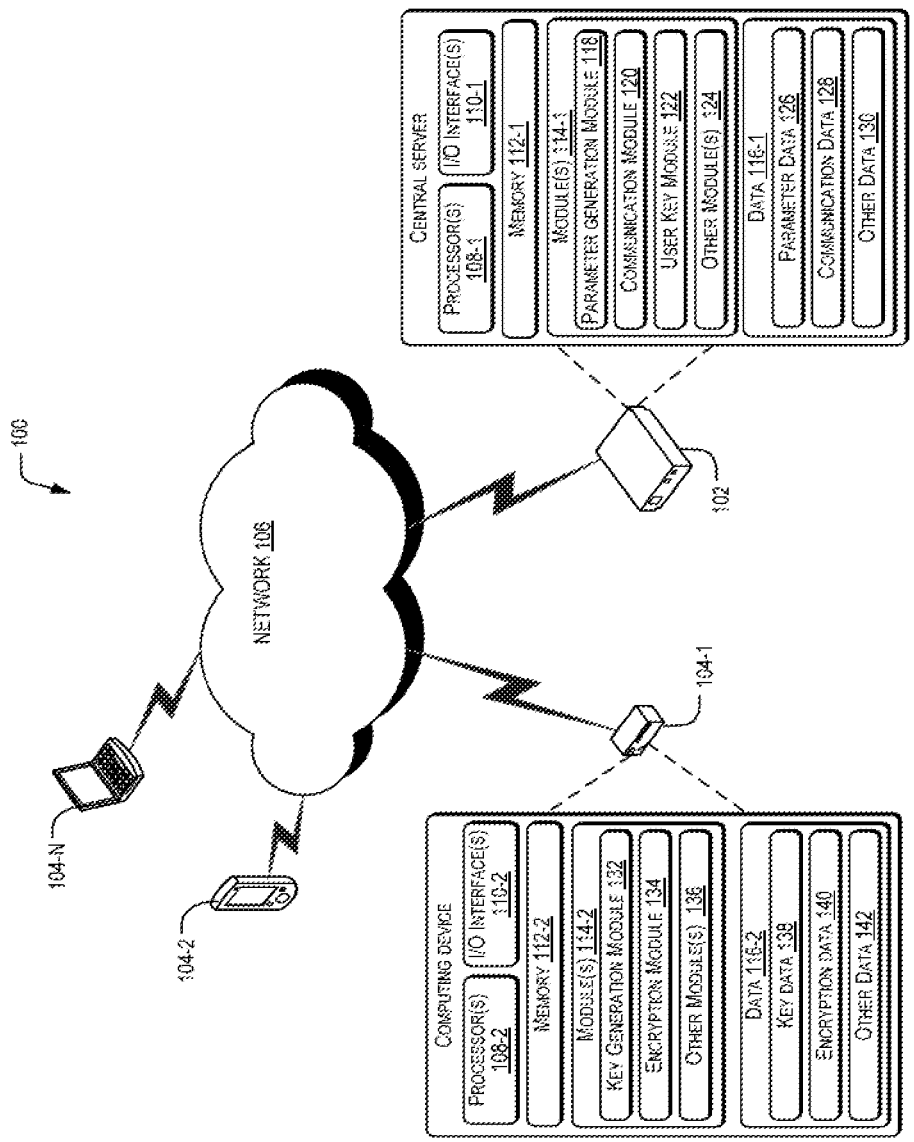
FIG. 1 illustrates a network environment implementing identity based encryption, according to an embodiment of the present subject matter.

With advancement in technology, a lot of information is exchanged between parties communicating over communication networks, such as the Internet. The advancement in technology has also led to an increase in threats to security of the information being exchanged amongst the communicating parties. For instance, the information may be wrongfully obtained by a malicious third party, say, a hacker, and may be used in a manner detrimental to the communicating parties.

In the recent past, cryptography has been widely used for ensuring security of information transmitted over a communication network. Cryptography is a methodology of encrypting data, for example, before transmitting data over the communication network, in such a manner that enables secure transmission of the data even in the presence of malicious third parties. Thus, even in case the malicious third parties gain access to the data, the malicious third parties may not be able to use the encrypted data.

In one conventional technique involving identity based encryption and decryption of data over an elliptic curve, i.e., identity based elliptic curve cryptography, the data which is to be transmitted may be encrypted using a public key of a receiver of the data. The public key of the receiver may be based on a public identity of the receiver. The encryption of data, based on the elliptic curve, involves several complex mathematical operations, for example, computationally intensive Tate pairing operation. The Tate pairing operation involves several complex computations and thus results in high consumption of battery, power, and processing resources. Further, such computations typically involve high computational time. Thus, the encryption of data may only be supported by devices having large processing capabilities, sufficient memory, and sufficient battery backup. However, the intensive computations pertaining to encryption of data may utilize a major portion of the processing resources of such devices, thereby slowing down the other operations handled by the devices. Due to the complexity involved in such computations and the corresponding intensive processing requirements, implementation of identity based elliptic curve cryptography may not be suitable in devices, such as mobile phones, smart phones, sensor nodes, and handheld devices used for lightweight applications, having less processing power, less memory, and limited battery backup.

The present subject matter describes method(s) and system(s) for identity based elliptic curve cryptography. In one implementation, public parameters including a Tate pairing value and a public key set generated by a central server may be utilized by a computing device for encrypting data. As the computing device can encrypt the data based on a pre-computed Tate pairing value, i.e., the Tate pairing value generated by the central server, the computing device need not perform the intensive Tate pairing computations during the encryption process, thereby resulting in an efficient identity based elliptic curve cryptography scheme. Further, the public parameters and the public key set generated in accordance with the present subject matter ensures quick computation of the algorithms associated with identity based encryption in a secure manner.

According to an embodiment of the present subject matter, the public parameters and the public key may be generated by the central server. Initially, a friendly prime and a torsion group prime order may be selected. The friendly prime and the torsion group prime order may then be used for determining the other parameters, such as a super singular elliptic curve, a first torsion group, a first elliptic curve point, a second elliptic curve point, and a distortion map, included in the public parameters. In one example, the friendly prime may be generated based on the torsion group prime order of bit length 160 bits thereby ensuring that the cryptographic scheme based on the friendly prime and the torsion group prime order is of high security standard. Further, the prime number and the torsion group selected are of a manner such that which ensures quick computation of the cryptographic operations.

Upon selection of the friendly prime and the torsion group prime order, a super-singular elliptic curve may be generated over a finite field based on the friendly prime. Thereafter, a first torsion group and a second torsion group may be ascertained based on the super-singular elliptic curve. The first torsion group and the second torsion group are generated in a form such that the number of points in the first torsion group and the second torsion group, i.e., the torsion group prime order, is equal to the above selected torsion group prime order. In one example, the first torsion group may comprise of all points obtained by repetitive addition of a point lying on the super-singular elliptic curve to itself until a point at infinity is obtained. Subsequently, a distortion map is used for generating the second torsion group based on the first torsion group. The second torsion group is an isomorphic image of the first torsion group.

Further, a first elliptic curve point and a second elliptic curve point, hereinafter collectively referred to as elliptic curve points, are selected from amongst the elements of the first torsion group based on one or more predetermined rules, for example, no degeneracy. The no degeneracy may be defined as a criterion according to which bilinear operation on the elliptic curve points should not result in integer value one. In one implementation, the elliptic curve points may be used for computing the Tate pairing value. In said implementation, the Tate pairing value may be computed by performing Tate pairing operation between the first elliptic curve point and the second elliptic curve point.

Thereafter, a master secret key set may be ascertained based on the friendly prime. In one example, the master secret key set may include integers in the range of one to one less than the friendly prime. Further, as will be understood, the master secret key set is not shared publically as doing the same may compromise the security of the encryption scheme. Based on the master secret key set, a public key set may be determined. The public key set may include a plurality of points pertaining to the first torsion group. In one implementation, the plurality of points are obtained as a result of point multiplication of the integers included in the master secret key set with the first elliptic curve point.

Subsequently, the friendly prime, the torsion group prime order, the super-singular elliptic curve, the first torsion group, the elliptic curve points, the distortion map, and the Tate pairing value are published, by the central server, as public parameters along with the public key set for being used in encryption and decryption of the data.

As mentioned previously, the computing device may encrypt the data using the public parameters and the public key set. For the purpose, initially a receiver identity (ID) of a receiver may be computed. The receiver ID may be generated based on a known public identity, for example, a mobile number, an email id, and the like, of the receiver using known hashing techniques. In one example, the receiver ID may be a 128 bit sequence. Thereafter, a receiver public key may be generated by adding all the points in a receiver key set obtained based on the receiver ID. The receiver public key is used to encrypt the data which is to be transmitted to the receiver.

Further, in order to encrypt the data, an encryption component is generated based on the receiver public key. The computing device may then encrypt the data based on the encryption component and the Tate pairing value to obtain the data in an encrypted form, hereinafter referred to as encrypted data. Thus, the encryption of data using the pre-computed Tate pairing value eliminates the need for computing Tate pairing operation by the computing device, thereby reducing the utilization of resources, such as battery and processors, required for performing the encryption operation. The encrypted data may then be transmitted to the receiver over the communication network.

The system(s) and method(s) of the present subject matter thus reduces the time required for implementing identity based cryptographic process and enables its use in devices running lightweight applications by circumventing the computation of Tate pairing operation while encrypting the data. The encryption scheme may thus be implemented in devices, such as mobile phones, smart phones, and handheld devices running lightweight applications, having less computational power, less memory, and limited battery power. Further, the public parameter and the public key set generated in accordance with the present subject matter are of a form which reduces the computation time associated with complex mathematical operations pertaining to encryption and decryption operations of cryptography.

These and other advantages of the present subject matter would be described in greater detail in conjunction with the following figures. While aspects of described system(s) and method(s) for identity based elliptic curve cryptography can be implemented in any number of different computing systems, environments, and/or configurations, the embodiments are described in the context of the following exemplary system(s).

FIG. 1 illustrates a network environment 100 implementing identity based encryption, according to an embodiment of the present subject matter. The network environment 100 includes a central server 102 in communication with a plurality of computing devices 104-1, 104-2 . . . 104-N, hereinafter collectively referred to as computing devices 104 and individually referred to as a computing device 104, through a network 106. Communication links between the computing devices 104 and central server 102 are enabled through a desired form of communication, for example, via dial-up modem connections, cable links, digital subscriber lines (DSL), wireless or satellite links, or any other suitable form of communication.

In one implementation, the central server 102 may be implemented as one or more computing systems, such as a desktop computer, a cloud server, a mainframe computer, a workstation, a multiprocessor system, a laptop computer, a network computer, a minicomputer, and a gateway server. Further, the computing devices 104 may be implemented as, for example, personal computers, multiprocessor systems, laptops, wireless devices, wireless sensors, M2M devices, and cellular communicating devices, such as a personal digital assistant, a smart phone, and a mobile phone, and the like.

The network 106 may be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and such. Further, the network 106 may include network devices that may interact with the central server 102 and the computing devices 104 through communication links.

According to an embodiment of the present subject matter, the computing device 104-1 may encrypt data using public parameters and a public key set published by the central server 102. In said embodiment, amongst other parameters, the public parameters may include a pre-computed Tate pairing value, generated by the central server 102, which may be utilized by the computing device 104-1 for encrypting the data. Use of the aforementioned public parameters including the Tate pairing value averts the computation of Tate pairing value during encryption of the data, thus facilitating encryption of data using lesser resources as compared to conventional encryption techniques. The generation of the public parameters and the public key set to be used for encryption may also be referred to as a setup operation.

For the purpose, the central server 102 and the computing device 104 include processors 108-1, 108-2, respectively, collectively referred to as processors 108 hereinafter. The processors 108 may be implemented as one or more microprocessors, microcomputers, microcontrollers, digital signal processors, central processing units, Tate machines, logic circuitries, and/or any devices that manipulate signals based on operational instructions. Among other capabilities, the processor(s) is configured to fetch and execute computer-readable instructions stored in the memory.

The functions of the various elements shown in the figure, including any functional blocks labeled as processor(s), may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term processor should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

Also, the central server 102 and the computing device 104 include I/O interface(s) 110-1 and 110-2, respectively, collectively referred to as I/O interfaces 110. The I/O interfaces 110 may include a variety of software and hardware interfaces that allow the central server 102 and the computing device 104 to interact with the network 106 and with each other. Further, the I/O interfaces 110 may enable the central server 102 and the computing device 104 to communicate with other communication and computing devices, such as web servers and external repositories.

The central server 102 and the computing device 104 may include memory 112-1 and 112-2, respectively, collectively referred to as memory 112. The memory 112-1 and 112-2 may be coupled to the processor 108-1, and the processor 108-2, respectively. The memory 112 may include any computer-readable medium known in the art including, for example, volatile memory (e.g., RAM), and/or non-volatile memory (e.g., EPROM, flash memory, etc.).

The central server 102 and the computing device 104 further include modules 114-1, 114-2, and data 116-1, 116-2, collectively referred to as modules 114 and data 116, respectively. The modules 114 include routines, programs, objects, components, data structures, and the like, which perform particular tasks or implement particular abstract data types. The modules 114 further include modules that supplement applications on the central server 102 and the computing device 104, for example, modules of an operating system.

Further, the modules 114 can be implemented in hardware, instructions executed by a processing unit, or by a combination thereof. The processing unit can comprise a computer, a processor, such as the processor 108, a state machine, a logic array or any other suitable devices capable of processing instructions. The processing unit can be a general-purpose processor which executes instructions to cause the general-purpose processor to perform the required tasks or, the processing unit can be dedicated to perform the required functions.

In another aspect of the present subject matter, the modules 114 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection. The data 116 serves, amongst other things, as a repository for storing data that may be fetched, processed, received, or generated by one or more of the modules 114.

In an implementation, the modules 114-1 of the central server 102 include a parameter generation module 118, a communication module 120, a user key module 122, and other module(s) 124. In said implementation, the data 116-1 of the central server 102 includes parameter data 126, communication data 128, and other data 130. The other module(s) 124 may include programs or coded instructions that supplement applications and functions, for example, programs in the operating system of the central server 102, and the other data 130 comprise data corresponding to one or more other module(s) 124.

Similarly, in an implementation, the modules 114-2 of the computing device 104 include a key generation module 132, an encryption module 134, and other module(s) 136. In said implementation, the data 116-2 of the computing device 104 includes key data 138, encryption data 140, and other data 142. The other module(s) 136 may include programs or coded instructions that supplement applications and functions, for example, programs in the operating system of the computing device 104, and the other data 142 comprise data corresponding to one or more other module(s) 136.

In operation, the central server 102 may initially generate public parameters and a public key set which may be subsequently published or provided to the computing devices 104 for encrypting and decrypting data. Encryption of the data based on the public parameters, as generated herein, averts the need for computing Tate pairing operation while encryption, thereby resulting in an efficient identity based encryption scheme. Further, the central server 102 may generate the public key set and the public parameters in a secure manner, for instance, by using a master secret key set as will be discussed in detail later.

For the purpose, a parameter generation module 118 may initially select a friendly prime (p) and a torsion group prime order (q) based on a prime generation technique. The friendly prime may be understood as a prime number of a special form, as will be discussed later, determined such that the complex algorithms used in the identity based elliptic curve cryptography may be computed in lesser time as compared to conventional techniques of computing the complex algorithms. Further, as will be understood, the torsion group prime order referenced herein is also a prime number different than the friendly prime. In said prime generation technique, initially a value of the torsion group prime order is ascertained based on the following relation:

$$q \leftarrow 2^\eta + 2*k + 1 \quad (1)$$

where, q is the torsion group prime order, $\eta$ is an integer having a bit value grater than 160 bits, i.e., $\eta \geq 160$, and k is another integer.

Based on the above relation, the parameter generation module 118 selects a torsion group prime order with a minimum bit length of 160 bits. Subsequently, the friendly prime is generated based on the following relation:

$$p \leftarrow q*4t - 1 \quad (2)$$

where p is the friendly prime, q is the torsion group prime order, and t is an integer.

Upon generation of the friendly prime, the parameter generation module 118 ascertains whether the generated friendly prime satisfies the following conditions:

$$p = 2^N \pm c \quad (3)$$

$$\log_2 c \leq (1/2)N \quad (4) \text{ and}$$

$$p \equiv 3 \bmod 4 \quad (5)$$

where N is the length of the friendly prime in bits and c is an integer, also known as a first variable. In one example, the friendly prime may be of bit length 512 bits.

In a case where the friendly prime satisfies the aforementioned conditions, the parameter generation module 118 selects the friendly prime as the desired friendly prime p. In a case, where the friendly prime does not satisfy the above conditions, the integer t is incremented by one and the new friendly prime is then analysed to obtain the desired friendly prime p. The selection of the friendly prime based on the torsion group order, as described above, ensures that the cryptographic scheme based on the aforementioned friendly prime and the torsion group is of a secure standard. For example, the parameter generation module 118 may generate a torsion group and a friendly prime as given below:

Friendly Prime (p):
10983676256208975543971041278530229147631096480
22928865503114153469686909343624968339609542505
83272879636740982263693728593951807995466301001184 452657841041367

Torsion Group Prime Order (q):
13729595320261219429963801598162786434538870600
28661081878892691837108636679531210424511928132
29091099545926227829617160742439759994332876251
48056582230130171

Upon selection of the friendly prime and the torsion group prime order, the parameter generation module 118 determines a super-singular elliptic curve (E/GF(p)) over a finite field based on the friendly prime. The super-singular elliptic curve may be understood as a set of elliptic curve points satisfying a given elliptic curve equation. In one example, the super-singular elliptic curve may include p+1 points and, as will be understood, also includes a point at infinity. In one example, the parameter generation module 118 may generate the super-singular elliptic curve having the following equation:

Equation of Super Singular Elliptic Curve:

$$y^2 = x^3 + x \quad (6)$$

Thereafter, the parameter generation module 118 may ascertain a first torsion group (S[q]) based on the super-singular elliptic curve. The elements of the first torsion group lie on the super singular elliptic curve. In one example, the first torsion group may be an additive subgroup of points lying on the super singular elliptic curve. Further, the number of elements of the first torsion group is equal to the torsion group prime order. The value of the torsion group prime order perfectly divides a value obtained by adding one to the value of the prime. In one implementation, the friendly prime and the torsion group prime order are related according to the relation given below:

$$q|(p+1) \quad (7)$$

Subsequently, the parameter generation module 118 may ascertain a second torsion group (T[q]) based on the first torsion group using a distortion map (Φ). In one example, the second torsion group may be an isomorphic image of the first torsion group over the super singular elliptic curve. The isomorphic mapping between the first and the second torsion groups simplifies the complex arithmetic operations. In one implementation, the distortion map used for obtaining the second torsion group may be of the following form:

$$\Phi: [e,f] \in S[q] \rightarrow \text{Point}[p-e, \text{sqrt}(-1)*f] \in T[q] \quad (8)$$

Further, the order of the second torsion group is equal to the order of the first torsion group, i.e., q.

Upon generation of the first torsion group and the second torsion group, the parameter generation module 118 may ascertain a first elliptic curve point (P) and a second elliptic curve point (Q), collectively hereinafter referred to as elliptic curve points, from the first torsion group based on the friendly prime. In one example, the first elliptic curve point may be generated based on known methods by selecting a random integer from within the range 1 to p−1. Subsequently, another random integer, different from the previous random integer, may be randomly selected from within the aforementioned range and ascertained as a master secret key (s). The master secret key then may be used for ascertaining the second elliptic curve point. In one implementation, the second elliptic curve point may be obtained as a result of point multiplication between the master secret key and the first elliptic curve point using the following equation:

$$Q = [s]P \quad (9)$$

where Q is the second elliptic curve point, s is the master secret key, and P is the first elliptic curve point.

In one example, the parameter generation module 118 may obtain the first elliptic curve point, the master secret key s, and the second elliptic curve point of the following form, expressed in Jacobian co-ordinates:

Elliptic Curve Point (P):
[x]=84774320408723859608471128240189512513099352
06137694359293826606576385337371410876654409828
74243069054750179161744565325151838706651255132
8921926675082346
[y]=15223893830655100048486511306704881399342401
22279447835657576590933463226106830838217959262
56720682942670703031171777240207118137724324521
82844069643762457960
[z]=1

Master Secret Key (s):
[x]=10948256399571592215005472071269646841570666
74176856084774320408723859608471128240189512513
09935206137694359293826606576385337371410876654
40 98287424306905475017916174456532515183870665125513289219266675082346
[y]=15223893830655100048486511306704881399342401
22279447835657576590933463226106830838217959262
76720682942670703031171777240207118137724324521
82844069643762457960
[z]=1

Elliptic Curve Point (Q):
[x]=66915172303021824801945469853790102911679193
94524240445730053539432675571841329378365268863
07637357846829095880656049852063963984519128464
9762068643441089990 2
[y]=28675665280324633346560738478988883918913588
24924567484556833767976763777434602169044694857
77563468633588052964276578980448376684090616663
71040101296973637 36
[z]=1

Further, in one implementation, the parameter generation module 118 may construct a master secret key set ({s,T}) comprising of the master secret key and a set (T) of distinct integers with each integer in the range of 1 to p−1. For example, the parameter generation module 118 may construct the set of distinct integers as T={$t_0, t_1, t_2, \ldots t_{255}$}, where each $t_i$ is a distinct integer in the range 1 to p−1. As would be understood, the parameter generation module 118 may generate each master secret key randomly. Thereafter, the parameter generation module 118 constructs a public key set ({P, γ}), based on the master secret key set. In one implementation, in order to construct the public key set, point multiplication operation may be performed between the first elliptic curve point and each of the element of the master secret key to obtain a corresponding point ($\gamma_i$) pertaining to the first torsion group as shown below:

$$\gamma_i = [t_i]P \quad (10)$$

As a result of the above point multiplication operation, the parameter generation module 118 constructs the public key set comprising of all such points. For instance, based on the master secret key set, the parameter generation module 118 may ascertain the public key set $\gamma = \{\gamma_0, \gamma_1, \gamma_2, \ldots \gamma_{255}\}$.

Thereafter, the parameter generation module 118 may compute a Tate pairing value (Y) which may be published as a public parameter and may subsequently be used for encrypting the data. In one implementation, the parameter generation module 118 may compute the Tate pairing value based on the first elliptic curve point and the second elliptic curve point using the Tate pairing operation. For example, the Tate pairing value may be computed using the following equation:

$$Y = e(P, \Phi(Q)) = e(P, \Phi(P))^s \quad (11)$$

where $\Phi(Q), \Phi(P) \in T[q]$. Based on the values of the P and the Q as obtained in the previous example, the parameter generation module 118 may compute a tate pairing value as:
Tate Pairing Value (Y):
Y(real part)=
64383682676154768314600306473498505205872670882
56356523804384015293726305167890021769746814170
16951268622150943939805969427484414411648683914
01721007625367682
Y (Imaginary part)=
56335227045964629281975846334901380810973087772
99567045396184212130838885157236197896080153295
97330199452889081677288315903996532701318836466
01161910374057650

The parameter generation module 118 may subsequently store the friendly prime, the torsion group prime order, the first elliptic curve point, the second elliptic curve point, the first torsion group, the super-singular elliptic curve point, the distortion map, and the Tate pairing value, interchangeably referred to as pre-computed Tate pairing value, as public parameters, along with the public key set in the parameter data 126. Thereafter, the communication module 120 may publish the public parameters and the public key set for being used in encryption of the data. In one implementation, the public parameters and the public key set may be obtained by the computing device 104-1 and the same may be subsequently stored in the key data 138.

As mentioned previously, the public parameters and the public key set may be used by the computing device 104-1 for encrypting the data. The encryption of the data based on the public parameters and the public key set which averts the need for performing the Tate pairing operation thereby resulting in less consumption of resources, such as battery power. Further, use of a public key set separate from the master secret key set ensures that the master secret key set is not published and thus security of the master secret key set is maintained.

In order to encrypt the data, the computing device 104-1 may initially compute a receiver public key of a receiver to which the data is to be transmitted over the network 106. For the purpose, the key generation module 132 may initially ascertain a receiver identity (ID) of the receiver based on any known public identity of the receiver using known hashing techniques. For example, the key generation module 132 may obtain the receiver ID based on any one of the e-mail id, mobile number, date of birth, and the like, of the receiver. In one example, receiver $ID_b = \{b_0, b_1, b_2, \ldots b_{128}\}$ is a 128 bit binary sequence representing the receiver ID.

Thereafter, the key generation module 132 may generate a receiver key set comprising of elliptic curve points based on the receiver identity. In one example, the receiver key set is a subset of the public key set. Based on the bits of the receiver ID, the key generation module 132 generates a receiver key set $\gamma_b = \{\gamma_{b0}, \gamma_{b1}, \gamma_{b2}, \ldots \gamma_{b127}\}$ using on the following equation:

$$\gamma_{bi} = \begin{cases} \gamma_i = [t_i]P & \text{if the } i^{th} \text{ bit of } ID_b = 0 \\ \gamma_{i+128} = [t_{i+128}]P & \text{if the } i^{th} \text{ bit of } ID_b = 1 \end{cases} \quad (12)$$

The key generation module 132 may then compute the receiver public key (Q_id) based on the receiver key set. In one implementation, the key generation module 132 may perform addition of all points of the receiver key set for obtaining the receiver public key using the following equation:

$$Q\_id = \left[\sum_{i=0}^{127} \gamma_{bi}\right] \quad (13)$$

$$= \left[\sum_{i=0}^{127} (t_{bi}[P])\right]$$

$$= \left[\left(\sum_{i=0}^{127} t_{bi}\right) \bmod q\right] P$$

In one example, the key generation module 118 may generate the receiver public key, represented in Jacobian co-ordinates, as:
Receiver Public Key (Q_Id):
[x]=28292155308326101027944987840062930348162436
08355826039528777821885954623893941148219054302
76798708882151393715112168035364871994003703191
22033654884906100745
[y]=82403816506910205230965173110299320723533094
71151280930553079635245222864887039014726028175
89358730860532458015609500146941545157882655614
96985266603412027212
[z]=1

The receiver public key thus generated may be stored in the key data 138 along with the receiver public key data for being used in encryption of the data. In one implementation, the encryption module 134 may encrypt the data based on an encryption component ($E_b$) determined based on the receiver public key set and a random number x in the range 1 to p−1. For the purpose, the encryption module 134 may obtain the receiver public key set stored in the key data 138 and compute the encryption component using the following equation:

$$E_b = [x]Q\_id \quad (14)$$

$$= x\left[\sum_{i=0}^{127} (t_{bi}[P])\right]$$

$$= \left[x\left(\left(\sum_{i=0}^{127} t_{bi}\right) \bmod q\right) \bmod q\right] P$$

where, $E_b$ is the encryption component, x is the random integer, and $t_b$ is a subset of the master secret key set corresponding to the receiver ID and may be represented by a mapping given below:

$$t_{bi} = \begin{cases} t_i & \text{if the } i^{th} \text{ bit of } ID_b = 0 \\ t_{i+128} & \text{if the } i^{th} \text{ bit of } ID_b = 1 \end{cases} \quad (15)$$

Upon computing the encryption component, the encryption module 134 may encrypt the data based on the encryption component, a random integer x, and the Tate pairing value received as one of the public parameters. The random integer may be selected from the range of one to one less than the value of the friendly prime. For example, the encryption module 134 may encrypt data M in the following manner:

$$M_{encrypt} = \{MY^x, E_b\} \quad (16)$$

In one example, the encryption module 134 may encrypt a message, say 'world is beautiful' and may obtain the message in an encrypted form of the following manner:
Encrypted Form:
3652764901969045828867152717206065381715880781811340356280151412335127294403900607084289943052 5067851115527657635225091815352130786257563726970681656034309763548505839732358210901126552212660026242113371072805106226007910928729214357773745517958968094535799458862544589124672330390229539191928919291155895714628040541047055376616244600923546001811604844405482153301981252125561604117121118617003572535861364467801403625980911326148941400960574478277159280364810569283297161405048169362092278546993088065487838685741686253936443102852922953183070030398241424251621964163678472307648309542600545316190866852773571524167556491318307208820882

Upon encryption of the data, the encryption module 134 may transmit the encrypted data, i.e., data in the encrypted form, to the receiver over the network 106. The Tate pairing value obtained from the public parameters averts the need for computing the Tate pairing operation at the computing device 102 thereby reducing the resources, such as battery and processor, being used in the encryption process.

Upon receiving the encrypted data, the receiver may send a private key request to the central server 102 through a computing device, such as the computing device 104-2 for obtaining a private key. The receiver may use the private key to decrypt the encrypted data. In one implementation, the private key request may include the receiver public key.

Upon receiving the private key request, the user key module 122 may generate a private key set of the receiver based on the master secret key set and the receiver ID identified based on the receiver public key. For the purpose, the user key module 122 may use the mapping (15) and equation (12) mentioned above. For example, based on the mapping (15) and the equation (12), the user key module 122 may generate the private key set as $t_b = \{t_{b0}, t_{b1}, t_{b2}, \ldots t_{b127}\}$. Thereafter, the user key module 122 computes the private key of the receiver based on the following equation:

$$S\_id = \left[s\left(\left(\sum_{i=0}^{127} t_{bi}\right)^{-1} \mod q\right) \mod q\right] P \quad (17)$$

where, S_id is the private key of the receiver, s is master secret key, and q is the torsion group prime order, and P is the first elliptic curve point.

In one example, a recipient of the encrypted message say bob may request for his private key. In said example, the user key module 122 may generate the private key for bob using his public identity. In said example, for the public identity being 'bob', the user key module 122 may obtain the private key, represented in Jacobian co-ordinates, as:
Private Key of Bob:
[x]=282921553083261010279449878400629303481624360835582603952877782188595462389394114821905430276798708821513937151121680353648719944003703191220336548849061007745
[y]=8240381650691020523096517311029932072353309471151280930553079635245222864887039014726028175893587308605324580156095001469415451578826556146968526660341202721
[z]=1

Subsequently, the user key module 122 may transmit the private key of the receiver to the computing device 104-2 over a secure communication channel over the network 106.

The computing device 104-2, upon receiving the private key, may then decrypt the encrypted data to obtain the data. In one example, decryption of data may involve Tate pairing operation, the computational complexity of which is highly reduced due to the public parameters being used for decryption process. For instance, the receiver may perform the Tate pairing operation, using the computing device 104-2, based on the private key and the encryption component in a manner as given below:
Tate Pairing Operation $$e(S\_id, \Phi(E_b)) = e(P, \Phi(P))^s \left(\left(\sum_{i=0}^{127} t_{bi}\right)^{-1} \mod q\right) x \left(\left(\sum_{i=0}^{127} t_{bi}\right) \mod q\right)$$

$$= Y^x$$

Upon obtaining the Tate pairing value, the receiver may subsequently decrypt the encrypted data to obtain the data in an apprehensible form. For instance, upon obtaining $Y^x$, the receiver may decrypt the encrypted data to obtain the data in a manner as described below:

Decryption Operation $$M = MY^x / Y^x \pmod{p}$$

where M is the data obtained upon decrypting the encrypted data $MY^x$, $Y^x$ is the Tate pairing value, and p is the friendly prime. In the example where the message ' world is beautiful' is encrypted, the message received upon decryption of the received encrypted data is 'world is beautiful'.

Figure 2:
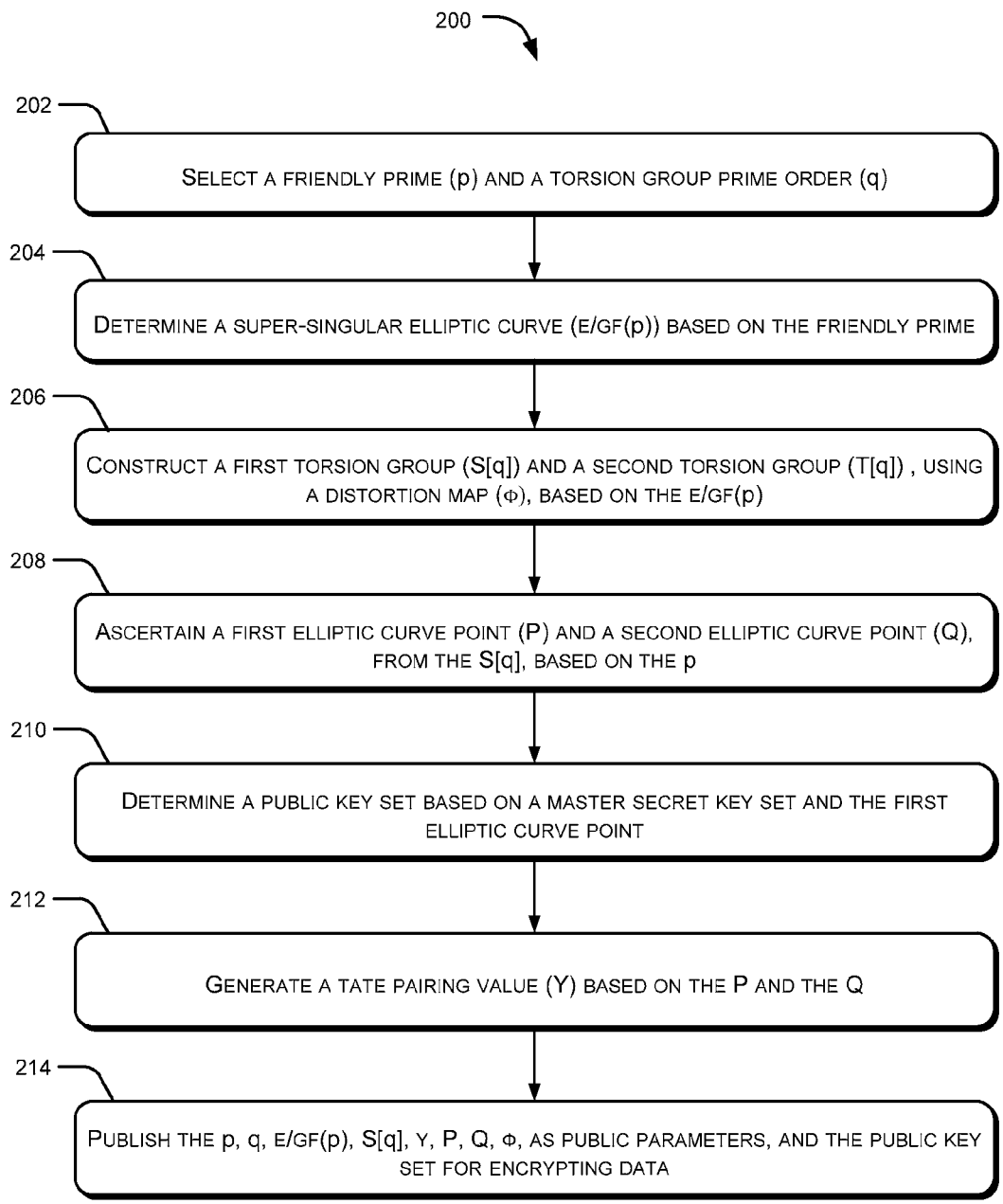
FIG. 2 illustrates a method for generating public parameters and a public key set for identity based encryption, in accordance with an embodiment of the present subject matter.
Figure 3:
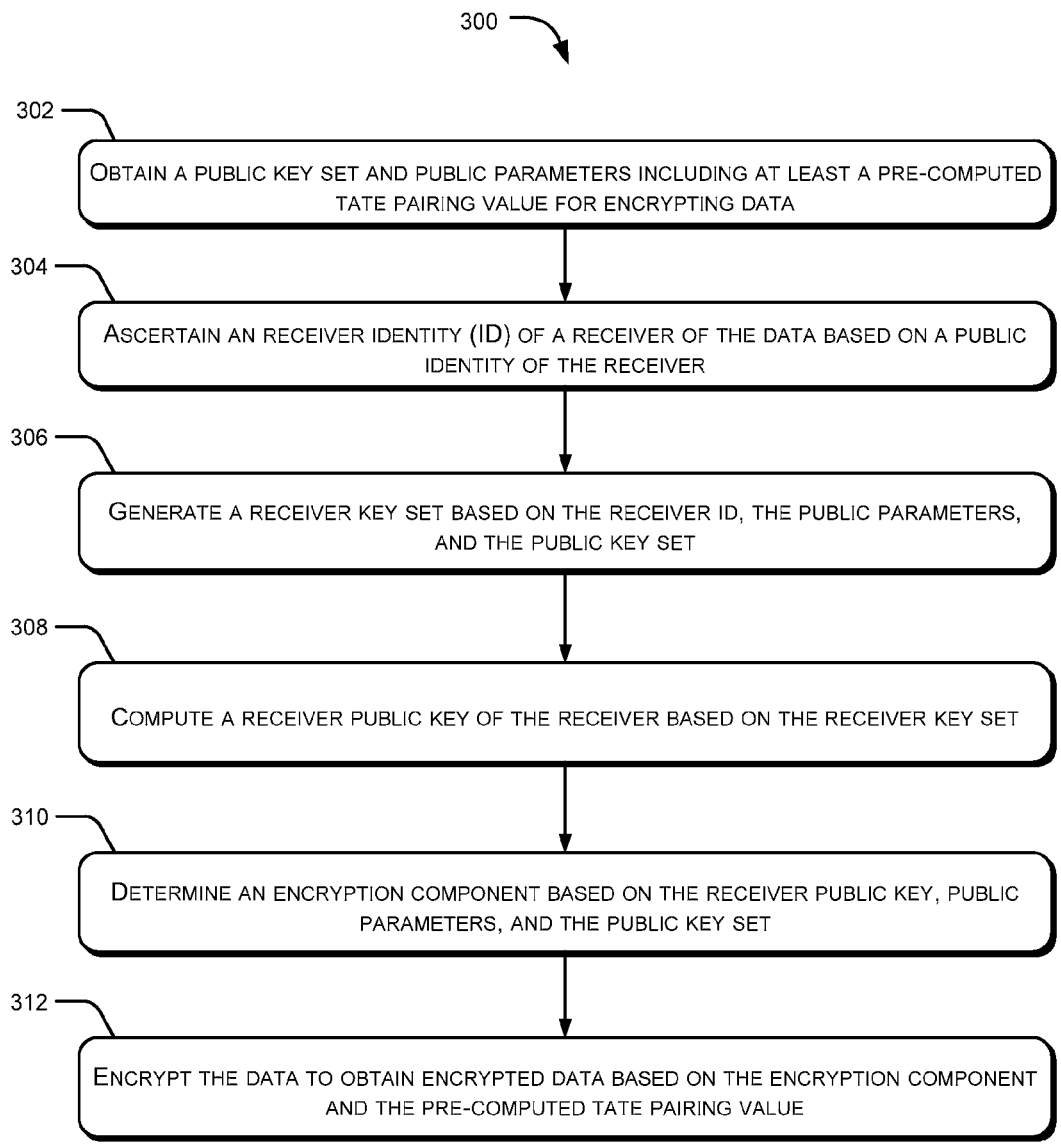
FIG. 3 illustrates a method for identity based encryption of data using public parameters and public key set, in accordance with an embodiment of the present subject matter.

FIG. 2 illustrates a method 200 for generating public parameters and a public key set for identity based encryption, in accordance with an embodiment of the present subject matter. FIG. 3 illustrates a method 300 for identity based encryption of data using public parameters and public key set, in accordance with an embodiment of the present subject matter.

The order in which the methods 200 and 300 are described is not intended to be construed as a limitation, and any number of the described method blocks can be combined in any order to implement methods 200 and 300, or an alternative method. Additionally, individual blocks may be deleted from the methods 200 and 300 without departing from the spirit and scope of the subject matter described herein. Furthermore, the methods 200 and 300 may be implemented in any suitable hardware, machine readable instructions, firmware, or combination thereof.

A person skilled in the art will readily recognize that steps of the methods 200 and 300 can be performed by programmed computers. Herein, some examples are also intended to cover program storage devices and non-transitory computer readable medium, for example, digital data storage media, which are machine or computer readable and encode machine-executable or computer-executable instructions, where said instructions perform some or all of the steps of the described methods 200 and 300. The program storage devices may be, for example, digital memories, magnetic storage media, such as a magnetic disks and magnetic tapes, hard drives, or optically readable digital, data storage media.

With reference to FIG. 2, at block 202, a friendly prime and a torsion group prime order are selected. In one implementation, the friendly prime and the torsion group prime order selected are of a form which facilitates fast computation of mathematical operations associated with an identity based elliptic curve cryptography scheme. For instance, the friendly prime and the torsion group order are selected in manner such that the friendly prime and the torsion group order satisfies the relations illustrated using the equations (1 to 5) as described above. Further, the friendly prime and the torsion group prime order may be used for determining other parameters used for encryption and decryption of data. In one example, the parameter generation module 118 may select the friendly prime and the torsion group prime order.

At block 204, a super-singular elliptic curve may be determined. Upon selection of the friendly prime, the super-singular elliptic curve may be determined. In one implementation, the super-singular elliptic curve may be defined over a finite field of points, where the finite field of points is based on the friendly prime. In one implementation, the parameter generation module 118 may determine the super-singular elliptic curve.

At block 206, a first torsion group and a second torsion group is constructed based on the super-singular elliptic curve. In one implementation, a first torsion group comprising of points lying on the super-singular elliptic curve is ascertained. In said implementation, an order of the first torsion group, i.e., the number of points in the first torsion group is equal to the torsion group prime order. Upon constructing the first torsion group, a second torsion group may be constructed. In one example, the second torsion group may be an isomorphic image of the first torsion group obtained using a distortion map. Further, the second torsion group has an order equal to the order of the first torsion group. In one implementation, the parameter generation module 118 may construct the first torsion group and the second torsion group.

At block 208, a first elliptic curve point and a second elliptic curve point, from the first torsion group, is ascertained based on the friendly prime. In example, a random integer in the range of one to one less than the value of the friendly prime is selected and subsequently a first elliptic curve point is ascertained using known methods. Based on the first elliptic curve point, a second elliptic curve point is generated. For the purpose, another random integer from the aforementioned range is selected as a master secret key. Thereafter, point multiplication operation is performed between the first elliptic curve point and the master secret key for obtaining the second elliptic curve point. In one implementation, the parameter generation module 118 may ascertain the first elliptic curve point and a second elliptic curve point.

At block 210, a public key set is determined based on a master secret key set and the first elliptic curve point. In one implementation, initially, the master secret key set comprising of distinct integers, which are generated randomly in the range one to one less than the friendly prime, is ascertained. Thereafter, a public key set may be determined based on the master secret key set and the first elliptic curve point. For the purpose, point multiplication operation may be performed between each of the integers of the master secret key set and the first elliptic curve point. As a result of the point multiplication operations, a plurality of points is obtained and may be included in the public key set. In one implementation, the parameter generation module 118 may determined the public key set.

At block 212, a Tate pairing value based on the first elliptic curve point and the second elliptic curve point may be generated. In one implementation, the Tate pairing value may be generated as a result of the Tate pairing operation performed using the first elliptic curve point and the second elliptic curve point. In one implementation, the parameters generation module 118 may generate the Tate pairing value.

At block 214, the public key set and public parameters are published for encrypting data. In one implementation, the friendly prime, the torsion group prime order, the super-singular elliptic curve, the first torsion group, the first elliptic curve point, the second elliptic curve point, the distortion map, and the Tate pairing value are published as public parameters along with the public key set. The public key set and the public parameters may then be used for encrypting the data.

With reference to FIG. 3, at block 302, public parameters and a public key set for encrypting data are obtained. In one implementation, a public key set and public parameters, which includes at least a pre-computed Tate pairing value, are obtained for encrypting data. In one example, the computing device 104-1 may obtain the public key set and the public parameters from the central server 102. In another example, the public key set, generated by the central server 102, may be in a memory of the computing device 104-1.

At block 304, a receiver identity (ID) of a receiver of the data is ascertained based on a public identity of the receiver. In order to encrypt the data, initially the receiver ID is ascertained based on the public identity of the receiver. The public identity may be any known identity of the receiver, for example, an e-mail id, a phone number, date of birth, and the like. In one example, hashing technique may be used for obtaining the receiver ID and may be a 128 bit binary sequence.

At block 306, a receiver key set based on the receiver ID, the public parameters, and the public key set is generated. In one example, the receiver key set may be a subset of the public key set and may be obtained as a mapping using the equation as illustrated in the equation (12) in FIG. 1. The receiver key set thus generated includes a point on the elliptic curve for each of the bits of the receiver ID.

At block 308, a receiver public key is computed based on the receiver key set. In one example, all the points of the receiver key set are added as illustrated in equation (13) for obtaining the receiver public key. In one implementation, the key generation module 132 may compute the receiver public key.

At block 310, an encryption component based on the receiver public key, the public parameters, and the public key set is determined. In one implementation, an encryption component may be determined for being used in the encryption process. In said implementation, the encryption component may be generated based on the receiver public key, the public parameters, and the public key set in a manner as described earlier in equation (14).

At block 312, the data is encrypted based on the encryption component and the pre-computed Tate pairing value. In one implementation, the data may be encrypted using the encryption component and the pre-computed Tate pairing value in a manner as described earlier in equation (16). The use of pre-computed Tate pairing value eliminates the need for performing the computationally extensive Tate pairing operations thus reducing the resources utilized for encrypting the data.

Upon encrypting the data, the encrypted data, i.e., the data in an inapprehensible form, may be transmitted to the receiver. The receiver, upon receiving the encrypted data may decrypt the data through a computing device, such as the computing device 104-2. For the purpose, a tate pairing operation may be performed by the receiver in a manner as describer earlier in the Tate pairing operation. Further, the receiver may then decrypt the data based on the Tate pairing value, obtained as result of the Tate pairing operation, in a manner as described earlier in decryption operation.

Although implementations for identity based encryption have been described in language specific to structural features and/or methods, it is to be understood that the appended claims are not necessarily limited to the specific features or methods described. Rather, the specific features and methods are disclosed as exemplary implementations for identity based encryption.

We claim:

1. A computer implemented method for encrypting data, the method comprising:
    obtaining, by a computing device, a public key set and public parameters, from a central server, wherein the public parameters include a friendly prime (p), a torsion group prime order (q), a super-singular elliptic curve (E/GF(p)), a first torsion group (S[q]), a pre-computed Tate pairing value (Y), a first elliptic curve point (P), a second elliptic curve point (Q), and a distortion map ($\phi$), and wherein the pre-computed Tate pairing value (Y) is generated by the central server, and wherein the friendly prime is ascertained based on the torsion group prime order using the equation p←q*4t−1, where p is the friendly prime, and q is the torsion group prime order, and t is an integer;
    determining, by the computing device, a receiver key set of elliptic curve points based on a receiver identity (ID) of a receiver, wherein the receiver key set is a subset of the public key set;
    computing, by the computing device (104), a receiver public key (Q_id) based on the receiver key set; and
    encrypting, by the computing device (104), the data using the Tate pairing value (Y) and an encryption component ($E_b$) for obtaining encrypted data, wherein the encryption component ($E_b$) is computed based on the receiver public key set.

2. The method as claimed in claim 1, wherein the determining further comprises ascertaining, by the computing device, the receiver ID based on a public identity of the receiver, wherein the receiver ID is a 128 bit sequence.

3. The method as claimed in claim 1, wherein the public key set includes a plurality of elliptic curve points pertaining to the first torsion group (S[q).

4. The method as claimed in claim 3, wherein the public key set is computed using a master secret key set comprising a master secret key (s) and a set of distinct integers (T), wherein the master secret key (s) is an integer selected from the range of 1 to p−1, and wherein each integer in the set of distinct integers (T) is selected from the range of 1 to p−1.

5. The method as claimed in claim 1, wherein the friendly prime (p) is based on a first variable (c) and Nth power of two, wherein N is an integer, and wherein base two logarithm of the first variable (c) has a minimum value greater than zero and a maximum value equal to half the value of the N given by the equation $\log_2 c \le (1/2)N$, and wherein the friendly prime (p) is congruent to 3 (mod 4), and wherein bit length of the friendly prime (p) is of at least 512 bits.

6. The method as claimed in claim 1, wherein the torsion group prime order (q) is a prime of bit length of at least 160 bits.

7. The method as claimed in claim 1, wherein the Tate pairing value (Y) is computed based on a first elliptic curve point (P) and a second elliptic curve point (Q) using Tate pairing operation.

8. The method as claimed in claim 7, wherein the first elliptic curve point (P) and the second elliptic curve point (Q) are ascertained based on a first torsion group (S[q]), wherein the first torsion group (S[q]) is constructed based on the super-singular elliptic curve (E/GF(p)) determined based on the friendly prime (p).

9. The method as claimed in claim 8, wherein a second torsion group (T[q]) is ascertained based on the first torsion group (S[q]) using a distortion map ($\phi$), wherein the second torsion group (T[q]) is an isomorphic image of the first torsion group (S[q]).

10. The method as claimed in claim 9, wherein the public key set is ascertained based on a master secret key set and the first elliptic curve point (P), wherein the public key set comprises a plurality of elliptic curve points pertaining to the first torsion group (S[q]), and wherein the master secret key set comprises a plurality of distinct integers in the range 1 to p−1.

11. The method as claimed in claim 1, wherein the method further comprises publishing the public key set and the p, q, E/GF(p), S[q], Y, P, Q, and $\phi$ as public parameters for encrypting the data.

12. A computing device comprising:
    a processor;
    a key generation module coupled to the processor to,
        obtain public parameters and a public key set, from a central server, wherein the public parameters include a friendly prime (p), a torsion group prime order (q), an super-singular elliptic curve (E/GF(p)), a first torsion group (S[q]), a pre-computed Tate pairing value (Y), a first elliptic curve point (P) and a second elliptic curve point (Q), and a distortion map ($\phi$), and wherein the pre-computed Tate pairing value (Y) is generated by the central server, and wherein the friendly prime is ascertained based on the torsion group prime order using the equation p←q*4t−1, where p is the friendly prime, and q is the torsion group prime order, and t is an integer;
        determine a receiver key set of elliptic curve points based on a receiver identifier (ID) of a receiver, wherein the receiver key set is a subset of the public key set, wherein the receiver ID is based on a unique identity of the receiver, and wherein the receiver ID is a 128 bit sequence; and
    compute a receiver pubic key of the receiver based on the receiver key set of elliptic curve points; and
    an encryption module coupled to the processor to encrypt data using the Tate pairing value (Y) and an encryption component ($E_b$), wherein the encryption component ($E_b$) is computed based on the receiver public key set and a random integer (x) in the range of 1 to p−1.

13. The computing device as claimed in claim 12, wherein the Tate pairing value (Y) is computed based on the first elliptic curve point (P) and the second elliptic curve point (Q) using Tate pairing operation.

14. The computing device as claimed in claim 12, wherein a torsion group prime order of the first torsion group (S[q]) and the second torsion group (T[q]) is computed using $q \leftarrow 2^\eta + 2*k+1$, where q is the torsion group prime order, and wherein $\eta$ is the bit length of the torsion group prime order and wherein $\eta \geq 160$ bits, and wherein k is another integer.

15. A non-transitory computer-readable medium having embodied thereon a computer program for executing a method of identity based encryption, the method comprising:

obtaining a public key set and public parameters, from a central server, wherein the public parameters include a friendly prime (p), a torsion group prime order (q), a super-singular elliptic curve (E/GF(p)), a first torsion group (S[q]), a pre-computed Tate pairing value (Y), a first elliptic curve point (P), a second elliptic curve point (Q), and a distortion map ($\phi$), and wherein the pre-computed Tate pairing value (Y) is generated by the central server, and wherein the friendly prime is ascertained based on the torsion group prime order using the equation $p \leftarrow q*4t-1$, where p is the friendly prime, and q is the torsion group prime order, and t is an integer;

determining a receiver key set of elliptic curve points based on a receiver identity (ID) of a receiver, wherein the receiver key set is a subset of the public key set;

computing a receiver public key (Q_id) based on the receiver key set; and encrypting the data using the Tate pairing value (Y) and an encryption component ($E_b$), wherein the encryption component ($E_b$) is computed based on the receiver public key set and a random integer (x) in the range of 1 to p−1.

* * * * *